Nov. 19, 1968 R. P. AUYANG 3,412,336

CIRCUIT FOR CONVERTING A TRAIN OF DURATION MODULATED PERIODICALLY RECURRING PULSES TO A TRAIN OF SIMILARLY MODULATED PERIODIC PULSES HAVING A DIFFERENT FREQUENCY OF RECURRENCE

Original Filed June 13, 1961 2 Sheets-Sheet 1

INVENTOR
RAYMOND P. AUYANG
BY Robert Lieber
ATTORNEY

Nov. 19, 1968 R. P. AUYANG 3,412,336

CIRCUIT FOR CONVERTING A TRAIN OF DURATION MODULATED PERIODICALLY RECURRING PULSES TO A TRAIN OF SIMILARLY MODULATED PERIODIC PULSES HAVING A DIFFERENT FREQUENCY OF RECURRENCE

Original Filed June 13, 1961 2 Sheets-Sheet 2

United States Patent Office 3,412,336

Patented Nov. 19, 1968

3,412,336

CIRCUIT FOR CONVERTING A TRAIN OF DURATION MODULATED PERIODICALLY RECURRING PULSES TO A TRAIN OF SIMILARLY MODULATED PERIODIC PULSES HAVING A DIFFERENT FREQUENCY OF RECURRENCE

Raymond P. Auyang, Ithaca, N.Y., assignor to International Business Machines Corporation, New York, N.Y., a corporation of New York Original application June 13, 1961, Ser. No. 109,563, now Patent No. 3,175,205. Divided and this application Aug. 18, 1964, Ser. No. 390,384

4 Claims. (Cl. 328—39)

This invention relates to information recording and reproducing systems, and more particularly, to random access memory systems which utilize rotating discs as a storage medium. This application is a division of my copending application, Ser. No. 109,563, filed June 13, 1961, now Patent No. 3,175,205.

In data processing and computing systems, information is frequently stored by recording the information and selectively reproducing the information when it is to be used. In one type of memory system for the storage of information, discrete areas of a recording medium are magnetized in accordance with electrical signals. In one such memory system, a rotating disc having a magnetizable surface is employed to store a relatively large amount of information in a relatively small space.

In such disc memory systems, the discrete areas of information are recorded in very closely spaced concentric tracks. Assuming that a transducer may be positioned over a desired track on the disc, means must be provided for insuring that the transducer maintains a position directly over the track center. Several systems have been devised for positioning a transducer relatively close to a data track center, but additional means must be provided for accurately controlling the transducer positioning means to find the data track center. These fine positioning systems must be capable of correcting for any mechanical discrepancies which may have resulted in a recording operation which may have caused the track to vary from its desired concentric position. The fine positioning control must also be able to correct for mistracking conditions caused by mechanical vibrations of the rapidly rotating storage disc or discrepancies between machines using the same disc.

One means for controlling the position of a transducer relative to the center of a data track has been to provide an accurately recorded pattern of servo control information. The servo control pattern is arranged on the disc to accurately define a concentric track which is a fixed predetermined distance from a desired data track. A servo transducer is mounted on the same positioning means with a data transducer. The two transducers are fixed at a distance apart equal to the predetermined distance between a servo track and a corresponding data track. Circuit means must be provided for reading a signal induced in the servo transducer for indicating that the servo transducer and thus the data transducer is not tracking along the desired track center.

One fine positioning control utilizes a servo pattern and transducer which produces a series of pulses which must be analyzed in accordance with amplitude and phase to determine any error correction needed. This system utilizes a transducer which is required to accurately balance out any generation of pulses when it is tracking in the desired relationship with the servo track. A well-balanced transducer and circuit are required to insure that when the transducer is accurately tracking, it reads servo information of two opposite magnetic polarities thus cancelling any effect on the transducer.

An object of this invention is to provide circuitry for converting a pulse width modulated cyclic signal at a first frequency to a pulse width modulated cyclic signal at a lower frequency.

Another object is to provide circuitry useful in a fine positioning control system for converting a pulse width modulated cyclic signal at a first frequency to a correspondingly modulated cyclic control signal at a different frequency.

A servo control system in accordance with this invention includes an array of frequency significant pairs of converging edge formations on a magnetic storage member. The array of edge formations describes a reference line situated in parallel with and at a predetermined distance from a storage path for data. A servo control positioning means is provided for mounting a servo transducer cooperating with the edge formations and a data transducer for cooperating with a data track. The servo transducer and data transducer are mounted on the positioning means at said predetermined distance apart. Means are provided for imparting relative movement between the magnetic storage member and the positioning means so that frequency significant signal pulses are created in the servo transducer. The time duration between adjacent signal pulses is used in circuit means for actuating the servo positioning means to cause the servo transducer to be moved to a position directly over the reference track center. When the servo transducer is tracking over the reference track center, the time duration between adjacent pulses in the transducer will be equal.

A feature of this invention is the provision of circuit means for converting the frequency at which signal pulses are generated in the servo transducer to a lower frequency signal retaining the same time duration characteristics between adjacent pulses.

The foregoing and other objects, features and advantages of the invention will be apparent from the following more particular description of a preferred embodiment of the invention, as illustrated in the accompanying drawings.

Figures 1, 1A:
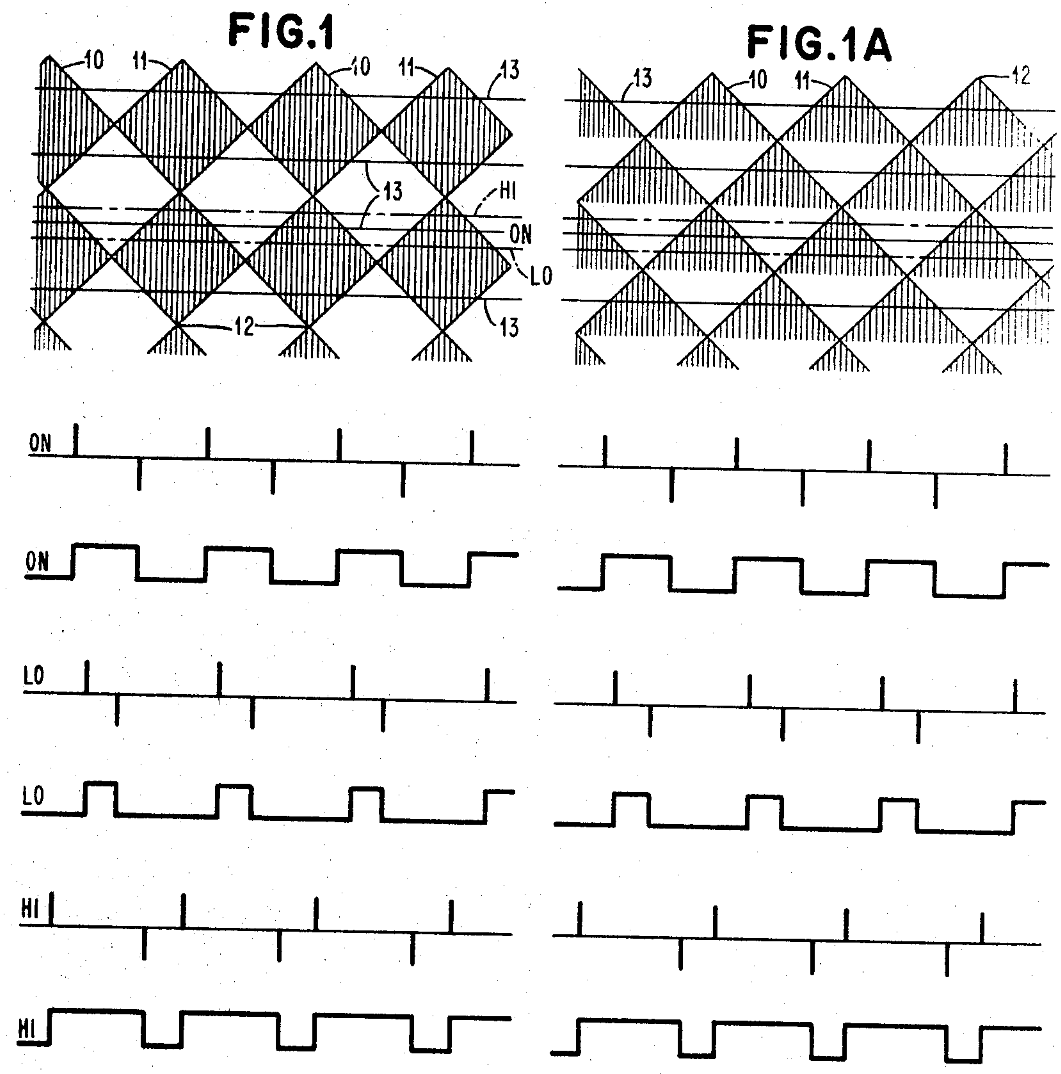
FIGURE 1 is a fragmentary view of the servo pattern on a magnetic recording disc and wave forms generated for certain tracking conditions.

FIGURE 1 shows one form of a permanently recorded servo pattern for practicing the present invention. This pattern consists of a first array of parallel edge formations 10 which converge at right angles with another array of parallel edge formations 11. The array of edge formations defines the boundaries between areas of oppositely magnetized portions of the disc surface (shown as shaded and clear areas). The edge formations 10 and 11 converge at points 12 which are midway between equally spaced reference tracks 13. The reference tracks 13 have been shown in FIGURE 1 as straight lines, but it is to be understood that these reference tracks are equally spaced concentric circles spaced on a magnetic recording disc.

Certain tracking conditions of the servo transducer have been shown in FIGURE 1 and have been labeled from top to bottom as HI, ON and LO. The wave forms below the servo pattern shown in FIGURE 1 represent pulse pairs and bistable signals generated as a result of the tracking conditions previously described.

As the servo pattern passes in proximity to the servo transducer, a pulse will be generated in the transducer for each edge formation crossed. The pulse polarity will depend upon the polarity of the magnetization change. As shown on the wave forms of FIGURE 1, the pulse pairs consist of a positive polarity pulse followed by a negative polarity pulse. The time duration between pulse pairs is defined as the time between a negative pulse and the next following positive pulse. The time spacing between pulses of a pair and between pairs of pulses will be dependent upon the particular tracking condition of the servo transducer relative to the servo track center. The pulses generated are utilized in the circuitry of FIGURE 2 to be described later to generate a square wave signal which changes states upon the occurrence of each pulse.

As can be seen in FIGURE 1, if the transducer is tracking exactly on the servo track center, designated as ON, the duration between pulses of each pair and the duration between each pair of pulses is equal and will generate a square wave signal having equal positive and negative portions. If the servo transducer is tracking LO, the duration between the pulses of a pair and the duration between pulse pairs will be such that for a complete cycle of the bistable signal there will be a greater negative portion than positive portion. In the HI tracking condition the time duration between pulses of each pair and the duration of between pulse pairs is such that the bistable signal resulting will have a larger positive portion than negative for each cycle.

The same concepts as described in relation to FIGURE 1 apply equally as well to the pattern shown in FIGURE 1*a*. FIGURE 1*a* shows a slight modification in the manner in which the servo pattern is recorded.

Figure 2:
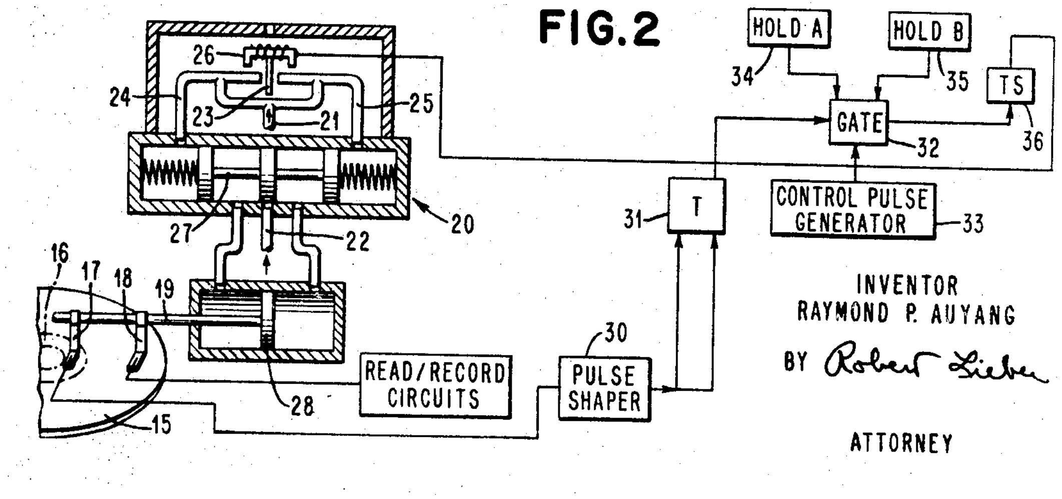
FIGURE 2 is a diagrammatic illustration of a positioning system and the circuit means for actuating the positioning system in response to servo information.

FIGURE 2 is a schematic representation of the entire system of the present invention. A fragmentary portion of a magnetic recording disc 15 is shown having a servo control pattern 16 recorded thereon. Cooperating with the magnetic disc 15 as it rotates is a servo transducer 17 and a data transducer 18 mounted a predetermined distance apart on a mounting means 19. Movements of the arm 19 are controlled directly by a fluid valve noted generally by the numeral 20. This device which makes up positioning means is a Moog Flow Control Servo Valve, Series 22, manufactured by the Moog Valve Company, Inc,. East Aurora, N.Y.

The operation of the positioning means 20 will now be briefly described. Fluid pressure is entered into the positioning system by way of ports 21 and 22. An armature 23 is operative to alternately open and close two ports 24 and 25 in response to the polarity of electrical excitation to an electromagnet 26. Excitation of one polarity to the electromagnet 26 will be effective to close port 25, and excitation of the opposite polarity will be effective to close port 24. Dependent upon the port, 24 or 25, which is closed by armature 23, fluid pressure entered at 21 will be effective to move a valve 27 either right or left. The port, 24 or 25, which is open allows the fluid pressure from 21 to leak out of the particular port which is open. Depending upon the direction that valve 27 is moved, fluid pressure entered at 22 will be effective to move the piston 28 either right or left.

If a bistable signal such as shown in FIGURE 1 were applied to the electromagnet 26, the piston 28 would oscillate back and forth in accordance with the polarity of a bistable signal applied. If a signal such as the ON bistable signal shown in FIGURE 1 were applied to the electromagnet 26, it can be seen that piston 28 would oscillate back and forth about a fixed point. If several cycles of the LO or HI bistable signal were applied to the electromagnet 26, the piston 28 would oscillate back and forth but would have resultant movement in one of the two opposite directions as a result of the fact that greater or lesser durations of the two states of the signal will be applied to the electromagnet 26.

The remaining portions of FIGURE 2 show another important feature of this invention. The operation described in the previous paragraph would be sufficient to correct HI or LO mistracking condition of the servo transducer 17. It has been found however, that the frequency at which the bistable signal operates as a result of the pulse pairs is too great to allow proper operation of the positioning means 20. A means was therefore devised for converting the frequency at which the bistable signal is generated as a result of the pulse pairs to a lower frequency bistable signal while retaining the same ratio of positive and negative portions of the signal in the lower frequency bistable signal. The original pulse pairs generated from the transducer 17 are applied through a pulse shaper 30 to a trigger 31 for generating the bistable signal shown in FIGURE 1. The bistable signal output of trigger 31 is applied to a gate arrangement 32. A frequency conversion control signal is applied to gate 32 by a control pulse generator 33. The control pulse generator 33 generates a symmetrical square wave gating signal at a frequency which is a sub-multiple of the frequency of the signal generated by trigger 31. The control signal may be generated by independent means or it could be generated by a separate timing track and transducer fixed to and related to a specific number of edge formations on the servo pattern.

First and second analog signal developing means 34 and 35, such as a conventional current integrator, are effective under control of the polarity of the control signal for developing an analog voltage having a value proportional to the sum of the durations of a group of the positive stable states of the trigger 31 output. During one-half of the control signal cycle analog means 34 will develop the analog voltage signal. During the second half of the control signal cycle analog circuit 35 will develop an analog voltage signal. During the second half of the control signal cycle the voltage of circuit 34 will be applied through gate 32 to a Schmidt trigger 36. The Schmidt trigger 36 will change its stable state upon application of the analog voltage signal and will maintain that stable state for a period equal to the time required for the analog voltage signal from circuit 34 to discharge to a predetermined level. Again during the first half cycle of the control signal, analog circuit 34 will develop an analog voltage signal while circuit 35 is controlling the stable state of the Schmidt trigger 36.

It is the output of the Schmidt trigger 36 which controls the energization of the electromagnet 26. Since the analog voltage developed in circuits 34 and 35 is directly proportional to the ratio of stable states from trigger 31, the duration of the stable states of Schmidt trigger 36 will be in the same direct proportion but at a frequency determined by the control signal generator 33.

Figure 3:
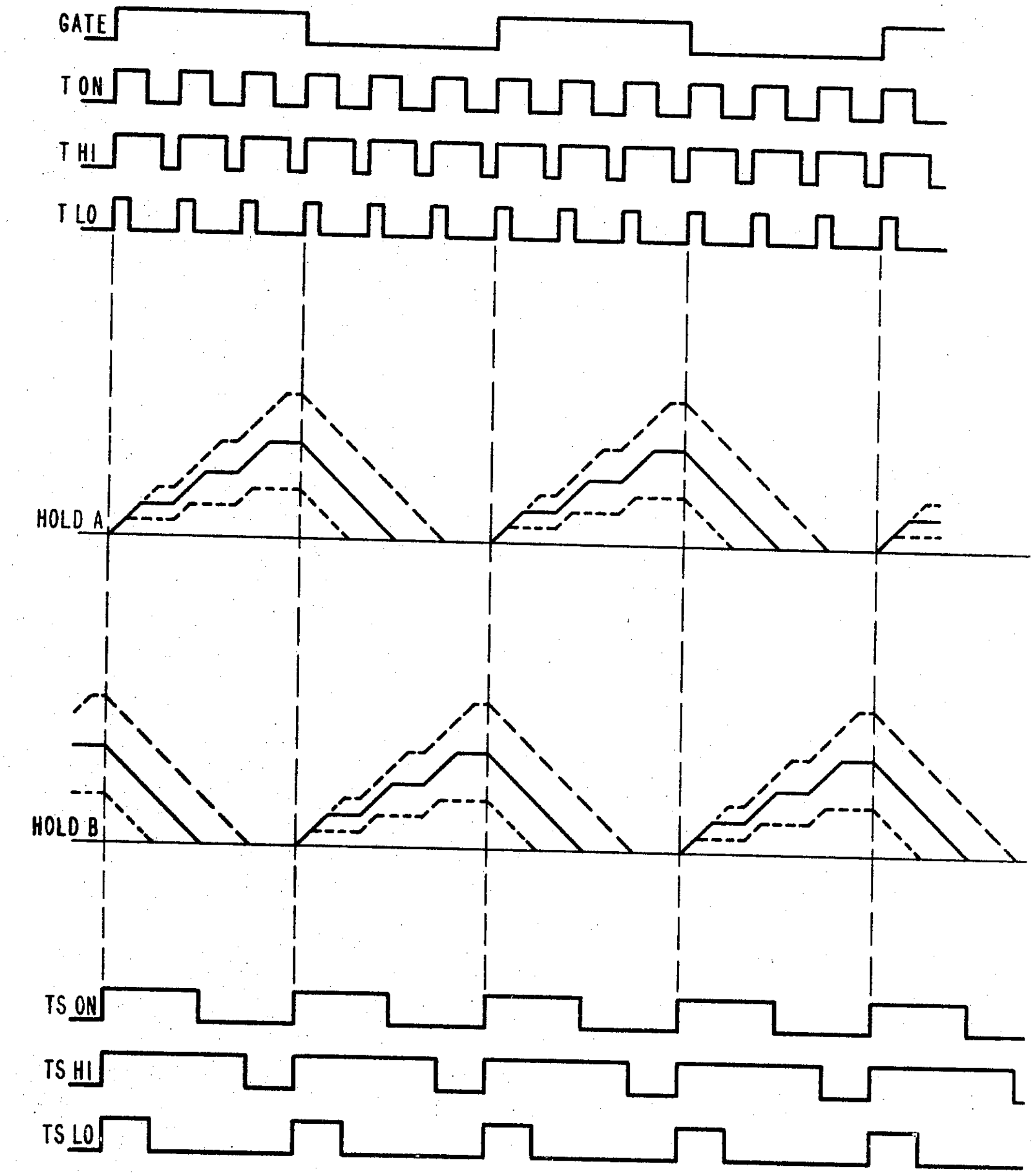
FIGURE 3 is a set of graphical illustrations showing the relative times of occurrence of signals within the circuitry of FIGURE 2 for certain tracking conditions.

FIGURE 3 shows various wave forms for making a frequency conversion of three-to-one for the various tracking conditions shown in FIGURE 1. The top wave form shows the bistable control signal applied to gate 32. The next three wave forms show the bistable signal generated by trigger 31 for a specified tracking condition. The next two wave forms, designated HOLD A and HOLD B, show the operation of the analog circuits 34 and 35 in response to the control signal and the bistable signal from trigger 31. The wave forms indicate how the voltage in analog circuit 34 (HOLD A) increases during the time that the output of trigger 31 and control pulse generator 33 are both positive. During the time that the output of control pulse generator 33 is a negative gating signal, the output of trigger 31 is gated to charge the capacitor in analog circuit 33 (HOLD B).

During the first half cycle of the control signal, analog circuit 34 charges a capacitor for a period equal to the positive stable state of the bistable signal from trigger 31. The control signal frequency is such that three complete cycles from trigger 31 are used to develop an analog voltage having a value proportional to the duration of the positive stable condition from trigger 31. At the commencement of the second half cycle of the control signal, analog circuit 35 starts developing an analog voltage signal. During this second half cycle while circuit 35 is being charged the analog voltage signal developed by circuit 34 is applied to the Schmidt trigger 36 and commences to discharge its capacitor. At the commencement of the discharge, Schmidt trigger 36 is caused to switch to a first stable state. The duration of this stable state is a function of the time constant of the analog circuit 34, and will, therefore, vary depending upon the value of the analog voltage developed. When the analog voltage has discharged to a predetermined level, the Schmidt trigger 36 will switch to its second stable state.

Under control of the bistable signal from the generator 33 Schmidt trigger 36 will produce a bistable signal having positive and negative portions in a ratio directly related to the ratio of positive and negative portions of the bistable signal developed from trigger 31. As mentioned previously, it is this analog voltage responsive bistable signal which is applied to the electromagnet 26 in the positioning means 20 for causing a resultant movement of the servo and data transducers to correct a mistracking condition.

There has thus been described a servo control system utilizing a pattern arrangement which does not require delicate balance between circuit components but utilize a a more easily controlled frequency or pulse width modulation. There has also been shown circuit means utilized as part of the present invention for effecting a frequency conversion while maintaining a pulse width modulation proportional to that of a signal at a higher frequency.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A frequency converter comprising:
a cyclic bistable signal source having a predetermined frequency and a variable ratio between first and second stable states in one cycle of said signal;
a cyclic bistable control signal source having a frequency which is a sub-multiple of said cyclic bistable signal source and having first and second stable states of equal duration;
means responsive to the first stable state of said control signal source and the sub-multiple number of the first stable state of said cyclic bistable signal source for developing an analog signal proportional to the sum of the durations of said sub-multiple number of first stable states of said cyclic bistable signal source;
and means responsive to said analog signal and the second stable state of said control signal source for producing a bistable signal having first and second stable states of the same ratio as said cyclic bistable signal source at said sub-multiple frequency.

2. A frequency converter comprising:
a cyclic bistable signal source having a predetermined frequency and a variable ratio between first and second stable states in one cycle of said signal;
a cyclic bistable control signal source having a frequency which is a sub-multiple of said cyclic bistable signal source and having first and second stable states of equal duration;
first and second conversion means responsive to the first and second stable states respectively of said control signal source and the sub-multiple number of the first stable state of said cyclic bistable signal source for developing an analog signal proportional to the sum of the durations of said sub-multiple number of first stable states of said cyclic bistable signal source;
and means selectively connectable to said first and second conversion means in response to the second and first stable states respectively of said control signal source for producing a cyclic bistable signal having first and second stable states of the same ratio as said cyclic bistable signal source at said sub-multiple frequency.

3. A frequency converter for converting duration modulated pulse signals recurring periodically at one frequency to pulse signals recurring periodically at a lower frequency with the same relative duration modulation as said signals at said one frequency comprising:
a source of first cyclic bistable signals having a first predetermined frequency and having a variable ratio between the durations of first and second stable phases in each cycle thereof;
a source of second cyclic bistable signals having a second predetermined frequency different from said first frequency and having first and second stable phases of equal duration in each cycle thereof;
means controlled during each first stable phase of said second signals for developing a control signal having a magnitude proportional to the sum of the durations of the first stable phases of said first signals occurring during each said first phase of said second signals; and
means responsive to the magnitude of said control signal for producing a third cyclic bistable signal having said second frequency and having the same variable phase duration ratio as said first signals.

4. A frequency converter system for modifying the frequency of recurrence of a train of duration modulated periodic pulse signals while preserving the duration modulation characteristic of the train comprising:
a first source of bistable signal pulses recurring periodically at a first predetermined frequency and having opposite stable phases of variable relative duration within each recurrence cycle;
a second source of bistable control signal pulses recurring periodically at a second predetermined frequency lower than said first frequency and having opposite pulse phases of equal duration in each recurrence cycle;
bistable trigger means operable to produce an output pulse signal of a first predetermined stable output magnitude as long as the magnitude of its input exceeds a first predetermined threshold magnitude after having risen above a second predetermined magnitude greater than said first threshold magnitude and operable to produce an output pulse signal of a second predetermined stable output magnitude different from said first stable output magnitude as long as the magnitude of its input remains below said second threshold magnitude after having declined below said first threshold magnitude;
first and second pulse integrating means; and
means coupled between said sources and said integrating means and between said integrating means and said trigger means for applying pulses from said first source to said first and second integrating means alternately in coincidence with alternate opposite phases of said control signal pulses and for simultaneously applying pulses from said second and first integrating means alternately to said input of said trigger means in coincidence with said alternate opposite phases of said control signal pulses, whereby at any instant of time, one of said integrating means is coupled to said first source and isolated from said trigger means while the other integrating means is isolated from said first source and coupled to said trigger means, thereby enabling said one of said integrating means to accumulate a variable magnitude of charge dependent upon said variable relative durations of successive phases of said signals emitted by said first source while said second source discharges a previously accumulated charge of like variable magnitude across said trigger means, and consequently causing said trigger means to alternate between opposite stable magnitude conditions at twice the recurrence frequency of said second source and with a variable relative duration of successive stable conditions corresponding to the average relative duration of the opposite stables phases of a series of pulses emitted concurrently from said first source.

References Cited

UNITED STATES PATENTS

| | | | |
|---|---|---|---|
| 2,562,694 | 7/1951 | Brown | 328—186 |
| 2,892,945 | 6/1959 | Ule | 328—127 X |
| 3,147,444 | 9/1964 | Ehrich | 328—127 X |
| 3,258,611 | 6/1966 | Candilis | 307—88.5 |

JOHN S. HEYMAN, *Primary Examiner.*

PO-1050
(5/69)

UNITED STATES PATENT OFFICE
CERTIFICATE OF CORRECTION

Patent No. 3,412,336 Dated November 19, 1968

Inventor(s) R. P. Auyang

It is certified that error appears in the above-identified patent and that said Letters Patent are hereby corrected as shown below:

Claim 4, Column 6, line 48 should read:

having risen above a second predetermined --threshold-- magni-

SIGNED AND
SEALED
JUN 2 1970

(SEAL)
Attest:

Edward M. Fletcher, Jr.
Attesting Officer

WILLIAM E. SCHUYLER, JR.
Commissioner of Patents